C. C. MERIWETHER.
CARD GAME.
APPLICATION FILED MAR. 24, 1919.

1,323,713.

Patented Dec. 2, 1919.

---

1  CREATION

THROUGH FAITH WE UNDER-
STAND THAT THE WORLDS WERE
FRAMED BY THE WORD OF GOD
SO THAT THINGS WHICH
WERE SEEN ARE NOT MADE
OF THINGS WHICH DO APPEAR.

HEB. 11:3

CREATION
ADAM & EVE
EDEN
SABBATH
TEST
SERPENT

---

2  ADAM & EVE

AND GOD SAID, LET US MAKE
MAN. IN OUR OWN IMAGE. AFTER OUR
LIKENESS, AND LET THEM HAVE
DOMINION OVER THE FISH OF THE
SEA, THE FOWL OF THE AIR, AND
OVER THE CATTLE, AND OVER ALL
THE EARTH, AND EVERY CREEPING
THING THAT CREEPETH UPON THE
EARTH                GEN. 1:26

CREATION
ADAM & EVE
EDEN
SABBATH
TEST
SERPENT

---

3  EDEN

AND THE LORD GOD PLAN-
TED A GARDEN EASTWARD
IN EDEN, AND THERE HE PUT
THE MAN WHOM HE HAD
FORMED---TO DRESS IT AND
TO KEEP IT.

GEN. 2:8-15

CREATION
ADAM & EVE
EDEN
SABBATH
TEST
SERPENT

---

4  SABBATH

AND GOD BLESSED THE
SEVENTH DAY AND SANCTIFIED
IT, BECAUSE THAT IN IT HE HAD
RESTED FROM ALL HIS WORK
WHICH HE HAD CREATED AND
MADE.

GEN. 2:3

CREATION
ADAM & EVE
EDEN
SABBATH
TEST
SERPENT

---

5  TEST

AND THE LORD COMMANDED
THE MAN, SAYING, OF EVERY TREE
OF THE GARDEN THOU MAYEST
FREELY EAT; BUT OF THE TREE
OF THE KNOWLEDGE OF GOOD
AND EVIL, THOU SHALT NOT EAT OF
IT; FOR IN THE DAY THAT THOU EAT-
EST THEREOF, THOU SHALT SURELY
DIE.         GEN. 2:16,17

CREATION
ADAM & EVE
EDEN
SABBATH
TEST
SERPENT

---

6  SERPENT

NOW THE SERPENT WAS
MORE SUBTIL THAN ANY
BEAST OF THE FIELD WHICH
THE LORD GOD HAD MADE

GEN. 3:1

CREATION
ADAM & EVE
EDEN
SABBATH
TEST
SERPENT

---

Inventor
C. C. Meriwether
By
Attorneys

UNITED STATES PATENT OFFICE.

CATHERINE C. MERIWETHER, OF ALEXANDER, NORTH CAROLINA.

CARD GAME.

1,323,713.

Specification of Letters Patent.

Patented Dec. 2, 1919.

Application filed March 24, 1919. Serial No. 284,526.

*To all whom it may concern:*

Be it known that I, CATHERINE C. MERIWETHER, a citizen of the United States, residing at Alexander, in the county of Buncombe and State of North Carolina, have invented new and useful Improvements in Card Games, of which the following is a specification.

The card game which is the subject matter of the present application for patent has been designed to combine religious instruction with innocent amusement, the material for playing the game being a set of cards, each card bearing a quotation from the Bible and a reference to the part of the Bible where the quotation may be found. A chain of words including proper names, is formed, and each title on a card is a link in the chain held in place by its relation to other titles as a whole; and particularly, by sound, association, time or history, or development of the subject to hold its place in the chain, for easier retention in the memory, so that the material of a like nature will naturally fall into place and be readily recalled.

In order that the invention may be better understood, reference is had to the accompanying drawing forming a part of this specification, and in said drawing, a set or "book" of six cards is shown. However, it is to be understood that a complete deck of cards may contain any desired number of books.

The cards illustrated are numbered from 1 to 6 and each contains a quotation from the Bible. At the top of the card is the title or name of the particular card, the same being followed by the quotation, and below the latter is a column of words intended to form the memory chain of words. This column of words is repeated on all the six cards of the "book," and other words as continuation of the chain will appear on the other "books" of the deck. The six memory chain words on the cards shown are arranged in the same order or sequence on all the six cards, and the heading or title of each card appears in the column of words thereon. The memory chain of words selected is as follows:

Creation
Adam & Eve
Eden
Sabbath
Text
Serpent

The word "Creation" is the first one on the list and this is the title of the first card of the book or the one numbered "1." The text or quotation on this card conforms to the title. The second word in the memory chain is "Adam & Eve" this being the title of the second card of the book or the one numbered "2," with a corresponding text on the card. This same scheme is followed with the remaining cards of the "book," as well as with the cards of the additional books.

The game is played as follows:

The dealer distributes all cards to the players, omitting himself. Now, beginning with the first word "Creation" in the memory chain of words, he calls for the cards, wherever held, in succession, from memory; placing them face down on the table. If he calls for a card out of its order in the chain, the first player correcting him may go on with the game, always beginning with the first word of the chain and repeating the list correctly to the point where the last player left off, and then proceeding. If the first player "gives up," the play continues to the left. The player reciting the chain of words, first hands his cards to the one from whom he takes the "turn." The winner is the first player to correctly repeat the chain to the end. The game may be played calling for lengths of the chain on each card, six titles, until the players are familiar with it.

Games of solitaire are played by building up or down, or in books.

The game can also be employed as an aid to the memory in teaching other subjects, such as languages, sciences, etc., but using a corresponding chain of words, and texts in conformity therewith.

I claim:

1. A set of playing cards, each card having a title, and also containing the titles of all the cards of the "book" to which the particular card belongs, including the title of the latter card, and said titles being arranged on each card in the same sequence as the respective cards in the "book."

2. A set of playing cards, each card having a title, and also containing the titles of all the cards of the "book" to which the particular card belongs, including the title of the latter card, and said titles being arranged on each card in the same sequence as the respective cards in the "book," each card also containing textual matter corresponding to its title.

In testimony whereof I affix my signature.

CATHERINE C. MERIWETHER.